United States Patent
McAllister et al.

(10) Patent No.: US 7,924,730 B1
(45) Date of Patent: Apr. 12, 2011

(54) METHOD AND APPARATUS FOR OPERATIONS, ADMINISTRATION AND MAINTENANCE OF A NETWORK MESSAGING LAYER

(75) Inventors: Shawn McAllister, Manotick (CA); Scott Drennan, Ottawa (CA); Steven Buchko, Dunrobin (CA); Jonathan Bosloy, Kanata (CA)

(73) Assignee: Solace Systems, Inc., Ontario (CA)

( * ) Notice: Subject to any disclaimer, the term of this patent is extended or adjusted under 35 U.S.C. 154(b) by 524 days.

(21) Appl. No.: 11/926,268

(22) Filed: Oct. 29, 2007

Related U.S. Application Data (60) Provisional application No. 60/863,399, filed on Oct. 30, 2006.

(51) Int. Cl.
*H04L 12/26* (2006.01)
*H04L 12/56* (2006.01)
(52) U.S. Cl. .................. 370/248; 370/392; 709/236
(58) Field of Classification Search .................. 370/241, 370/241.1, 248, 392, 389, 390, 508; 709/227–229, 709/230, 236–237
See application file for complete search history.

(56) References Cited

U.S. PATENT DOCUMENTS

| | | | | |
|---|---|---|---|---|
| 6,151,696 | A * | 11/2000 | Miller et al. | 714/748 |
| 6,629,138 | B1 * | 9/2003 | Lambert et al. | 709/224 |
| 2002/0165956 | A1 * | 11/2002 | Phaal | 709/224 |
| 2005/0226161 | A1 * | 10/2005 | Jaworski | 370/241 |
| 2007/0283002 | A1 * | 12/2007 | Bornhoevd et al. | 709/224 |

* cited by examiner

*Primary Examiner* — Seema S Rao
*Assistant Examiner* — Mon Cheri S Davenport
(74) *Attorney, Agent, or Firm* — Marks & Clerk; Richard J. Mitchell (57) ABSTRACT

A method of performing connectivity verification in a content routed network including a plurality of routers and wherein messages are transported through the network over a message transport layer, involves sending from an originating router a ping request message over the message transport layer along a user data path to a terminating router using a content routing protocol. The terminating router responds with a ping reply message upon receipt of the ping request message, and the message transport layer is monitored for the ping reply message at the originating router. Trace messages can also be sent through the network to determine whether subscribers are reachable for messages originating from a particular publisher. Also trace messages can be sent through the network to determine whether subscriptions from a particular subscriber are reachable from a particular originating router.

16 Claims, 7 Drawing Sheets

Figure 1

S1 to S4 = Subscriber
P = Publisher
A, B, C, D = Message router

R = Message router
U = Network user
Pub = Publisher
Sub = Subscriber
d = document

Diag Request Field Contents

Figure 13

Diag Reply TLV Contents when Diag
Type = "Egress Router Reply"

Diag Reply TLV Contents when Diag
Type = "Transit Router Reply"

Figure 14

METHOD AND APPARATUS FOR OPERATIONS, ADMINISTRATION AND MAINTENANCE OF A NETWORK MESSAGING LAYER

CROSS REFERENCE TO RELATED APPLICATION

This application claims the benefit under 35 USC 119(e) of U.S. patent application No. 60/863,399, filed Oct. 30, 2006, the contents of which are herein incorporated by reference.

FIELD OF THE INVENTION

This invention relates to data communication networks, and in particular to methods of monitoring connectivity and latency and troubleshooting such network problems for an message layer overlay network.

BACKGROUND OF THE INVENTION

Communication systems and networks are typically decomposed according to protocol layers which encapsulate various communication functions. The OSI model for example, which is well known in the art, prescribes seven layers in a communication network. Various Operation, Administration and Maintenance (OAM) functions are required in a communications network and these are typically specified at each communication layer for various reasons including to reduce dependencies between layers, to aid in fault isolation as well to deal with layer-specific or technology-specific issues within that layer. Examples of these types of functions include fault management (fault detection, fault verification and fault isolation) and performance management (loss, delay, delay variation measurement and availability). For example, OAM mechanisms are defined separately at layer 2 for protocols such as SONET and Ethernet, at layer 2.5 for ATM and MPLS and at layer 3 for IP. A general discussion of layered OAM requirements for layer 2 Virtual Private Networks (VPN) services can be found in "L2VPN OAM Requirements and Framework" (draft-ietf-l2vpn-oam-req-frmk-06.txt) from the Internet Engineering Task Force (IETF), the contents of which are incorporated herein by reference. Examples of layer 2 OAM functions can be found in "OAM Functions and mechanisms for Ethernet based networks", ITU-T Y.1731, an example of ATM OAM functions is found in ITU-T I.610 "B-ISDN operation and maintenance principles and functions" February 1999, and an example of MPLS OAM can be found in RFC4379 from the Internet Engineering Task Force (IETF). The contents of all these specifications are incorporated herein by reference. At layer 3, various prior art exists, for example, as produced by the IP Performance Metrics working group (IPPM) of the Internet Engineering Task Force. In particular, "IPPM Metrics for Measuring Connectivity", RFC2678, the contents of which are incorporated herein by reference, is used to measure various types of connectivity at the IP layer.

Likewise, the requirement to provide such OAM functions at the "messaging layer" for management of messaging system overlay networks is needed.

In the prior art, there are many examples of messaging systems that provide for loosely coupled message delivery between the message source and the receiving application (for one-to-one delivery) or receiving applications (for one-to-many delivery). Routing of messages can be based on named destinations, such as a topic, subject, queue or Web Service Address (WSA) as defined by the World Wide Web Consortium (W3C) or can be based on actual message content. The message system itself is typically implemented by one or more general purpose computer servers running middleware software or by custom-built message routers operating at layers 4-7 of the OSI model, above the network layer (layer 3 of the OSI model). In many cases, this "message layer network" is an overlay to an Internet Protocol (IP) network. Connectivity between middleware software entities running on distinct servers or between message routers is achieved using layer 4 protocols such as Transmission Control Protocol (TCP) or User Datagram Protocol (UDP). In this manner, several middleware instances or message routers are linked together via layer 4 connections to form an overlay to the IP network, complete with its own topology and communication paths. Users of this message layer network are typically applications residing on separate computer equipment, which then establish communication with their serving middleware or message router via layer 4 connections as well. In this message layer overlay network, we find the same requirements to be able to perform fault management and performance management, as described previously. Existing mechanisms known in the art to perform OAM at layers 3 and below are insufficient to perform fault and performance management at the message layer because they operate at layers below the messaging layer.

Existing implementations of message layer networks, such as those implemented by Java Messaging System (JMS) implementations, do not provide for the ability to monitor the messaging overlay for connectivity, latency and proper functioning of the various overlay communication paths of the messaging layer.

SUMMARY OF THE INVENTION

According to one aspect of the present invention there is provided a method of performing connectivity verification in an application layer overlay network, for example a content routed network, including a plurality of routers and wherein messages are transported through the network over a message transport layer, comprising sending from an originating router a ping request message over said message transport layer along a user data path to a terminating router using a content routing protocol; the terminating router responding with a ping reply message upon receipt of said ping request message; and monitoring said message transport layer for said ping reply message at the originating router.

In another aspect the invention provides a method of checking the delivery of messages to a particular subscriber in a content routed network including a plurality of routers, comprising detecting a particular message at an ingress router that the particular subscriber expects to receive; said particular message being forwarded to a content matching and forwarding engine in the ingress router for forwarding; examining an output of the content forwarding and matching engine for message deliverability to a router having an identifier corresponding to an egress router attached to the particular subscriber; and issuing an alert in the event that the message cannot be routed to the egress router.

In a still further aspect the invention provides a method of checking that subscriptions issued by a particular subscriber in a content routed network including a plurality of routers are reachable from other message routers in the network, comprising collecting subscriptions from the particular subscriber; creating a message that matches each subscription; and forwarding said message as a trace message to determine whether said message will reach said particular subscriber.

In yet another aspect the invention provides a method of performing connectivity verification in an application layer overlay network including a plurality of routers and wherein messages are transported through the network over a message transport layer, comprising sending from an originating router a first message over said message transport layer along a user data path to a terminating router; the terminating router responding with a second message upon receipt of said message; and monitoring said message transport layer for said second message at the originating router.

The invention also provides novel routers configured to implement the above methods.

The invention offers the ability to perform record route, traceroute and diagnostic functions on the overlay network.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
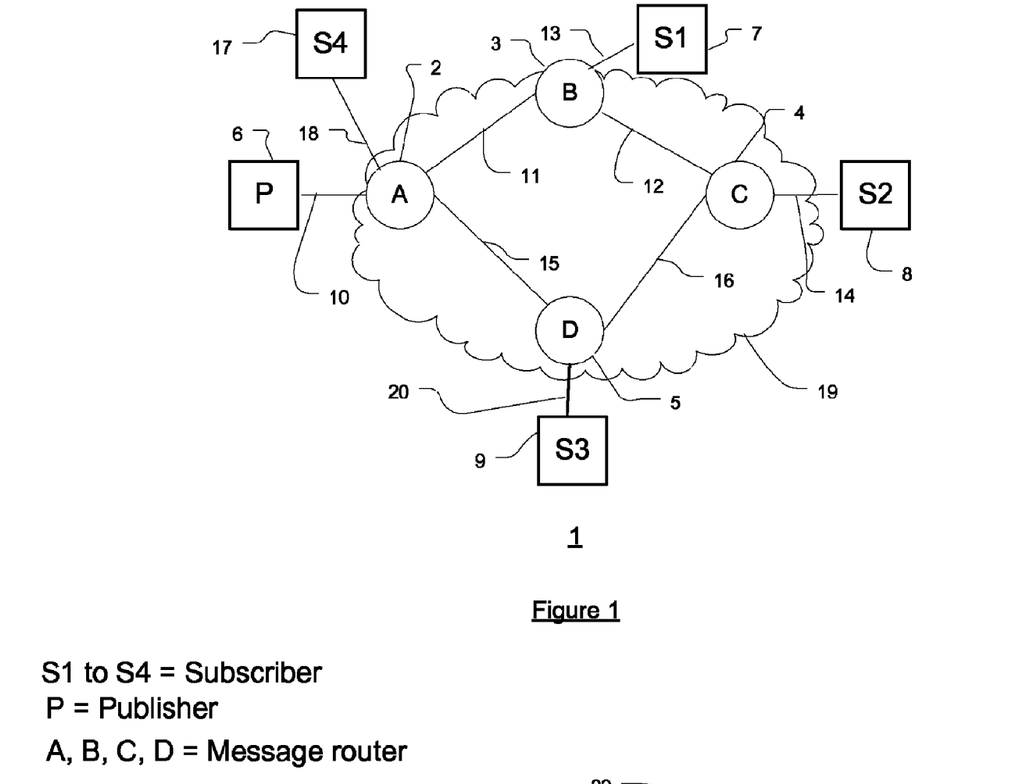
FIG. 1 shows an example message network in which OAM procedures are to be used.

FIG. 1 shows an example system 1 consisting of message delivery network 19 which is providing a scaleable, distributed message delivery service, as well as clients for the service. Network 1 consists of message routers 2 through 5, interconnected by virtual links 11, 12, 15 and 16.

An example of a device which can serve as a message router 2 through 5 is the VRS/32 Value-Added Services Routing System from Solace Systems, Inc. The virtual links between the message routers could be provided by one or more Transmission Control Protocol (TCP) connections, as is known in the art, or could use other protocols such as UDP, or could utilize physical links such as Ethernet or SONET in place of virtual links. Users of network 19 are a Publisher 6 connected to message router 2 via link 10 and subscribers S1, S2, S3 and S4 (7, 8, 9, 17) connected to routers 3, 4, 5 and 2 via links 13, 14, 20 and 18 respectively. Note that while only a small number of clients is shown, such a delivery network can support a large number of clients, such as millions, and can scale to a large number of message routers. Routers 2 through 5 may be deployed as an overlay to an underlying network, such as an IP/MPLS network, or other communications networks as is known in the art.

Figure 2:
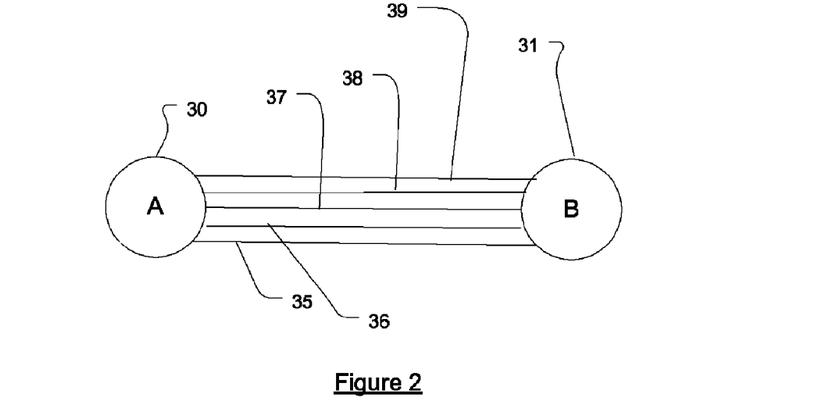
FIG. 2 shows a plurality of logical connections between two message routers, where each connection is used to provide a different Class of Service (COS) to the network users.

The connections between the routers 2 through 5 could be composed of a plurality of virtual connections, such as Transmission Control Protocol (TCP) or User Datagram (UDP) connections, as explained earlier and as is known in the art. This is depicted in FIG. 2. In FIG. 2, there are two routers 30 and 31 interconnected via five connections 35 through 39. In the preferred embodiment, connections 35 through 38 are four TCP connections used to provide different Classes of Service (COS) to the users of the network as explained in U.S. Ser. No. 11/182,756 incorporated herein by reference. Connection 39 is a UDP connection used for UDP messaging between routers 30 and 31 to provide a fifth class of service. Note that message transfer could occur bi-directionally between routers 30 and 31 over these connections, or yet another set of five connections could exist—five for messages in the 30 to 31 direction, and a different five for the 31 to 30 direction. These connections could be provided by other virtual circuit technologies such as ATM, Frame Relay or MPLS as is known in the art, and more or fewer classes of service could also be provided.

Also in network 19 of FIG. 1, a routing protocol could be used between the routers 2 through 5 to perform message routing. Routing could be performed at a subject, topic or queue level as is known in the art for systems such Java Messaging Systems (JMS), or based on a Web Service Address, but preferentially is performed based on the content of the message using content routing techniques. An example of a method for content routing of messages is detailed in U.S. Ser. No. 11/012,113, the contents of which are incorporated herein by reference.

As a short summary of the forwarding method detailed in this reference, the inbound router 2 of FIG. 1, upon receiving a message from publisher 6, determines the set of local subscribers interested in the message (subscriber 17), as well as the set of remote message routers interested in the message (routers 3 and 4) based on the content of the message. When the message is sent onwards to message routers 3 and 4, a shared copy of the message may be forwarded upon common routes. In the example of network 19, the preferential route to routers 3 and 4 from router 2 is via link 11, so a single copy of the message is sent on link 11, indicating a destination list of router 3 and 4. Upon receiving the message, router 3 can immediately forward the message onwards to router 4 (via link 12), after removing itself from the destination list, and then, since router 3 appears in the destination list, router 3 can process the message for delivery to its interested local client 7. Router 4 processes the message since it is in the destination list, and sends the message to interested client 8.

Figure 3:
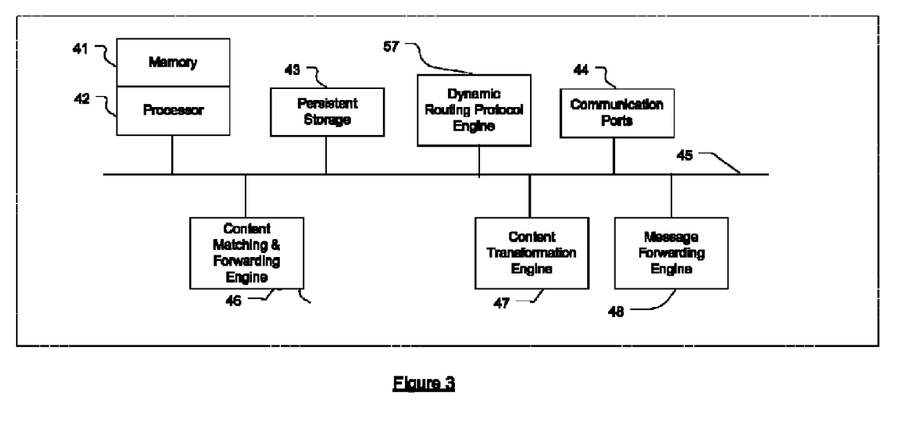
FIG. 3 shows a block diagram of a device that may be used in this invention.

The message routers themselves can be software middleware running on general purpose computing equipment, or preferentially combine hardware and software components as shown in FIG. 3. FIG. 3 depicts a message router 40 preferentially containing several hardware and software components, namely one or more processor blocks or Central Processing Units (CPU) 42 used for executing program logic, memory block 41 used to store program logic and state information, persistent storage block 43 such as a disk or Flash memory used for persistent storage of program instructions and configuration information, Dynamic Routing Protocol Engine 57 used to implement the dynamic routing protocol to perform routing based on message content, communication ports 44 used to provide communication with other entities in network 19 of FIG. 1 via such technologies as Ethernet, SONET, or others as known in the art, Content Matching & Forwarding engine 46 to perform content-based routing such as described in U.S. application Ser. No. 11/224,045, the contents of which are herein incorporated by reference, Content Transformation Engine 47 used to perform transformation of user's content such as described in U.S. application 60/731,477, the contents of which are herein incorporated by reference, Message Forwarding Engine 48 used for message forwarding and virtual connection termination and processor bus 45 used to provide communication between the various functional blocks, which could be PCI, PCI-Express or other inter-component communication bus technology or switching fabric technology. Blocks 44, 46, 47 and 48 are collectively referred to as the "Dataplane" since they collectively perform the fast path data forwarding and processing.

Figure 4:
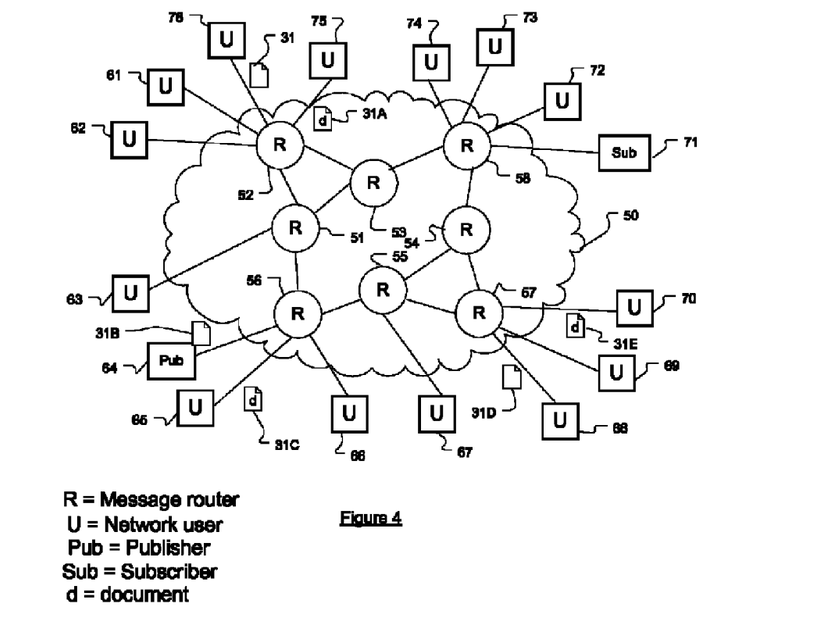
FIG. 4 shows a more complex message network used to describe this invention.
Figure 5:
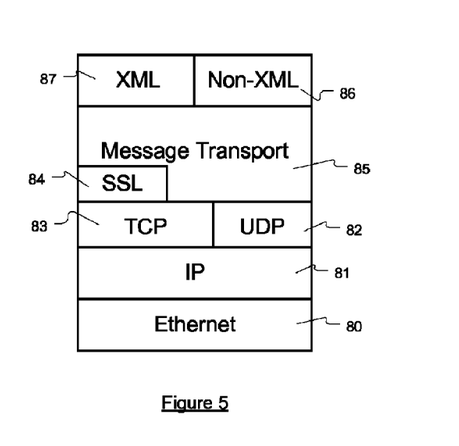
FIG. 5 shows the protocol layers involved in message transport in a messaging network.

FIG. 4 comprises a network 50 of message routers 51 to 58, and users of the network 61 to 76. Various communication links between the message routers are also depicted, each one of which can preferentially contain one or a plurality of connections, such as 35 to 39 of FIG. 2. Over each such connection, a communication protocol stack is preferentially used to perform message transfer, as depicted in FIG. 5. In the preferred embodiment, Ethernet 80 is used to provide layer 2 connectivity, Internet Protocol (IP) 81 is used to provide the network layer, TCP 83 or UDP 82 is used at the transport layer, encryption using Secure Socket Layer (SSL as is known in the art) 84 may optionally be used, a Message Transport layer 85 is used to frame the message within the transport stream and carry metadata associated with the message, and the user payload is then either XML 87 or non-XML 86 data or a multi-part payload with XML 87 and non-XML 86 components. It should be noted that variations on any of the protocol layers could be used without altering the applicability of the invention, and alternative protocols can be used at the various layers (such as SONET in place of Ethernet 80) without altering the scope of the invention. Message routing within network 50 can be performed based on destination topic, subject or queue as is known in the art for JMS and other messaging systems, or based on Web Service Address, or preferentially can be performed based on message content, as described in U.S. Ser. No. 11/012,113, referenced earlier.

Intra-Network Connectivity Verification

The first OAM mechanism described in this invention is a mechanism to detect data plane faults between message routers in a messaging network overlay. This capability is modeled after the ping capability "Internet Control Message Protocol" RFC792 from the Internet Engineering Task Force (IETF) whose contents are incorporated herein by reference. Such a capability is required in order to ensure that message traffic is in fact passing end-to-end between edge message routers since some faults may not be detected by control plane or management plane software and therefore cause "black holes" for user messages. In order detect such faults in the dataplane, including the Content Matching and Forwarding Engine 46 and Message Forwarding Engine 48 of FIG. 3 and communication channels 35 through 39 of FIG. 2, a special ping request message is sent from one router via a one or more intermediate routers to terminating router, and then a ping response message is returned to the original sender. It is important that the ping request message traverse "inband" along the path of user data. Should a response not be received by the sender, then fault isolation can be performed to determine the location of the black hole as described below. This type of end-to-end path verification at the message layer though the various message layer hardware and software components cannot be performed using normal mechanisms such as IP ping and is not currently available in the art in messaging systems today.

Figure 6:
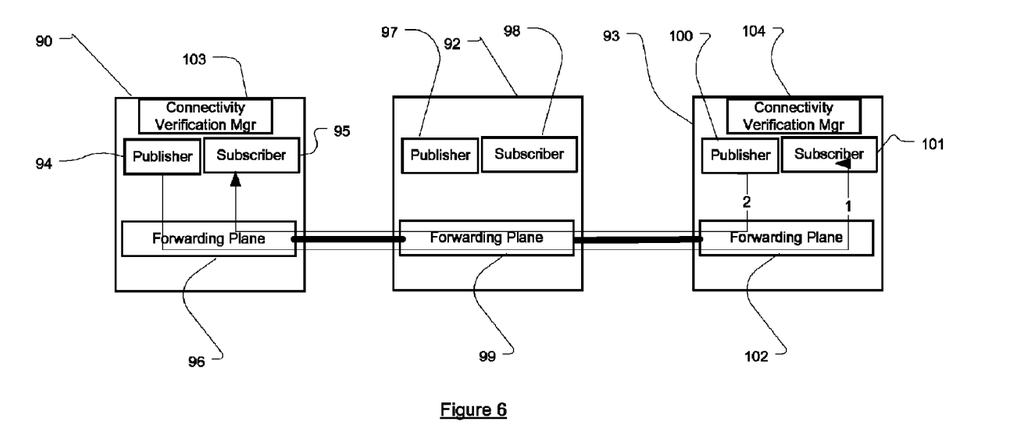
FIG. 6 shows the components involved in performing message layer OAM in a message network.

Referring to FIG. 4, we will explain by way of example, the method used to detect loss of connectivity between message router 56 and message router 57 in network 50. Further detail on the components required is depicted in FIG. 6. Source message router 90 of FIG. 6 will perform connectivity tests to destination message router 93 via the intermediate message router 92. It should be noted that, without loss of generality, there could be a plurality of intermediate message routers between message routers 90 and 93. The dataplane entities 96, 99 and 102 are preferentially comprised of functions 44, 46, 47 and 48 of FIG. 3.

Subscriber 101 has been configured to inject a specific subscription into the routing control plane which could be a subscription for a particular topic, subject or queue, or Web Service Address or preferentially is a content-based subscription as described in U.S. 60/530,615 to receive ping-request messages destined for its message router 93. Through routing control protocols also as described in U.S. 60/530,615, this subscription is carried to the source message router 90 as well as to every other message router in the network.

Similarly, subscriber 95 injects a subscription into the control plane for specific ping-reply messages to be received as described below. Connectivity Verification Mgr 103 is configured to publish a message that is intended to be delivered to subscriber 101 because it matches the subscription injected by subscriber 101. Configuration of Connectivity Verification Mgr 103, subscriber 95 and subscriber 101 can be via a Command Line Interface (CLI) or other means as is known in the art.

Figure 7:
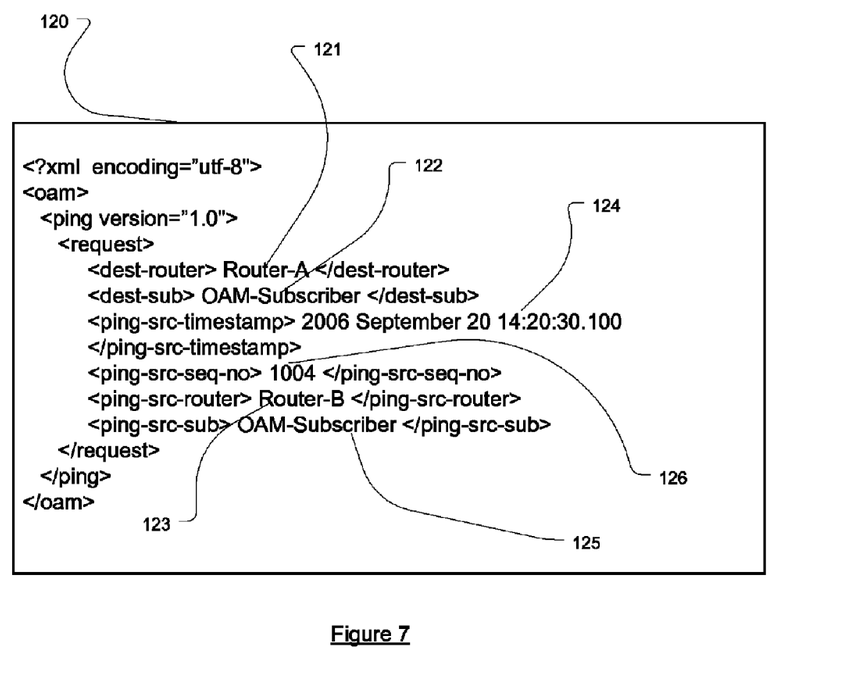
FIG. 7 shows the contents of an XML OAM ping request message used for connectivity verification.

The Connectivity Verification Mgr 103 initiates the connectivity verification test by creating a ping-request message such as message 120 of FIG. 7. In message 120, fields 121 and 122 preferentially contain the information that subscriber 101 from FIG. 6 has subscribed to in order to receive these ping request messages.

Other information may be provided by Connectivity Verification Mgr 103 of FIG. 6 such as a source timestamp 124 and a source sequence number 126 which are preferentially returned to the publisher in the reply message 140 of FIG. 8 as described later.

After constructing the ping-request message 120 of FIG. 7, the Connectivity Verification Mgr 103 of FIG. 6 requests the publisher 94 to inject the ping-request message 120 to Forwarding Plane 96 where it is preferentially routed by Content Matching and Forwarding Engine 46 and forwarded by Message Forwarding Engine 48 of FIG. 3 to message router 92. In addition, a particular Class of Service (COS) can also be specified with the ping-request message 120 to ensure that it receives this COS throughout the message network and the underlying IP network and thus travels along the appropriate links (one of 35 through 39 of FIG. 2). The ping-request message 120 sent by message router 90 to message router 92 preferentially comprises the protocol layers 87, 85, 83, 81, 80 of FIG. 5. At message router 92, dataplane 99 determines the next hop of the ping-request message 120 toward its final destination (router 93) and sends it to message router 93 along a link that is appropriate for the COS of the message.

Dataplane 102 of router 93 determines that the ping-request message is destined to a local subscriber and performs message content routing using the Content Matching and Forwarding Engine 46 of FIG. 3 to determine that subscriber 101 is to receive the ping request message 120 and delivers it to subscriber 101. When subscriber 101 of FIG. 6 receives the ping-request message 120, it passes the message 120 to Connectivity Verification Mgr 104 which then constructs the XML ping-reply message 140 of FIG. 8 using the data from message 120 of FIG. 7 and sends it to publisher 100. Preferentially, fields 141 and 142 of FIG. 8 are populated from fields 123 and 125 respectively of FIG. 7 and therefore match the subscription injected earlier by subscriber 95 of FIG. 6. Fields 144 and 146 of FIG. 8 are populated from fields 124 and 126 respectively of FIG. 7. Field 147 of FIG. 8 is populated with a timestamp from the clock at the ping destination router 93. This allows the computation of transit delay in each direction if the source and destination message routers have clocks that are being synchronized to sufficient accuracy.

Clock synchronization can be achieved by methods well-known in the art such as using Network Time Protocol (NTP) or various external clock synchronization sources. Publisher 100 sends the ping reply message 140 to dataplane 102 to be routed to its final destination (router 90). Dataplane 102 determines that message router 90 is to receive the ping-reply message and that message router 92 is the next hop in the path, so the ping-reply is sent to message router 92 which forwards it to message router 90. Message router 90 determines that the message is addressed to it and performs a routing lookup based on the contents of the message to determine that it is to be delivered to subscriber 95. Subscriber 95 receives the ping-reply message and passes it to Connectivity Verification Mgr 103.

Figure 8:
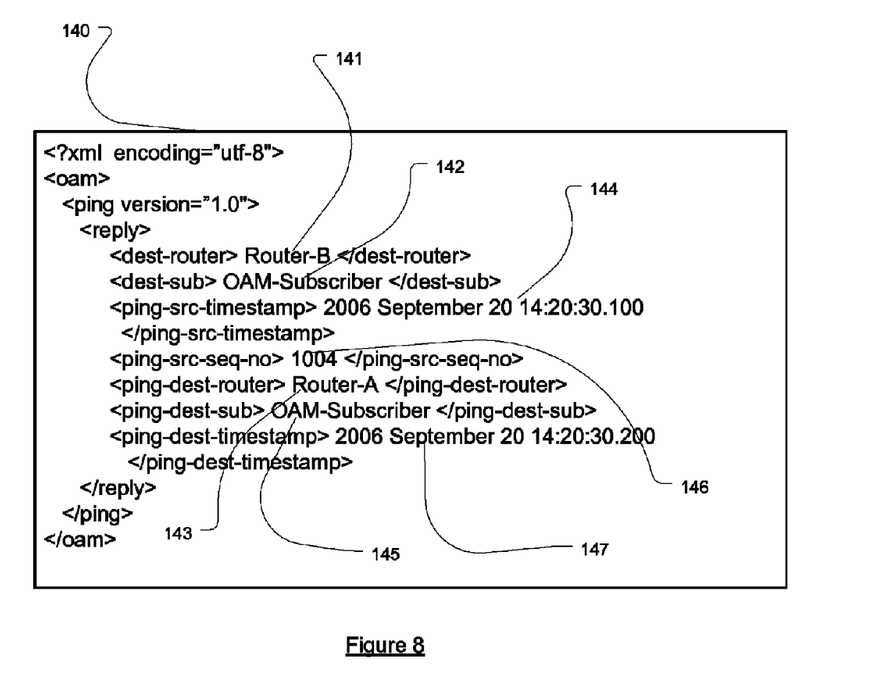
FIG. 8 shows the contents of an XML OAM ping reply message used for connectivity verification.

The Connectivity Verification Mgr 103 validates the received sequence number 146 of FIG. 8 and the ping destination 143 and 145 of FIG. 8 against the values 126, 121 and 122 respectively from the ping-request message 120 of FIG. 7. Having received the ping-reply, Connectivity Verification Mgr 103 reports that there exists connectivity to message router 93. Upon receiving the ping-reply message, Connectivity Verification Mgr 103 may record a timestamp of its local clock to perform a variety of message latency calculations. For example, bidirectional latency is computed by subtracting the timestamp when the ping-reply is received from field 124 of FIG. 7.

If the clocks between the two message routers are synchronized to a sufficient accuracy, then unidirectional latency can also be computed. Latency in the direction from message router 90 to message router 93 is computed by subtracting field 124 of FIG. 7 from field 147 of FIG. 8. Latency in the direction from message router 93 to message router 90 is computed by subtracting field 147 of FIG. 8 from the timestamp at Connectivity Verification Mgr 103 when the ping-reply message was received. Computation of such messaging latencies can then be used to monitor for changes in connectivity latency between message routers as an indication of degrading system performance that may then require operator attention.

It should be noted that the main components performing the connectivity verification application, 103, 94, 95, 104, 100, 101 of FIG. 6 may be located internal to the message routers 90 and 93, or may be external to the message routers. The connectivity verification process may be an ongoing background process executing on each message router in network 50 of FIG. 4 toward a plurality of other message routers in the network, or it could be initiated on demand by some external system communicating with ping source and destination routers via a command line interface (CLI), Simple Network Management Protocol (SNMP), or any other management protocol known in the art. The connectivity verification procedures can also be initiated from any message router in network 50 of FIG. 4 to any other message router in network 50 to monitor datapath connectivity, through all components and all COS paths on an ongoing or directed basis. Note that in a JMS environment, sending such a message to a JMS queue would allow the same type of point-to-point connectivity and latency monitoring to occur.

A variation on the mechanism above is to employ a multicast ping request message which is targeted to a plurality or all message routers in network 50. This is preferentially achieved by using a special value in field 121 of FIG. 7 to which the set of OAM subscribers on the desired message routers have subscribed. In so doing, a ping-request message created by Connectivity Verification Mgr 103 of FIG. 6 is sent to dataplane 96 which finds several matching subscriptions for this message and proceeds to send this ping-request message to all such destinations to be received by the OAM subscriber on each target message router. Ping-reply messages are returned to the source message router as described previously for it to determine connectivity and messaging latency, as described above. Note that in a JMS network, such a multicast ping mechanism can be achieved by having appropriate subscribers subscribe to a JMS topic and having the publishing application send to that topic, which will result in the message being multicast to all desired destinations.

A multicast ping request to a plurality of message routers in network 50 can also be achieved by replication field 121 such that multiple destination routers can be listed in the ping request message 120. The content matching and forwarding engine 46 will match a subscription from a subscriber such as 101 against any instance of the repeated field 121. Either this technique or the technique above with a special value for field 121 allows a ping request 120 to target a selected set of routers in network. A key aspect is that such a ping follows the same processing in the network, including application-layer multicast forwarding, that any message would when requested by multiple subscribers at various points in the network 50. This type of reachability verification at the messaging layer is not possible using existing techniques at lower layers of the protocol stack because content processing of the message payload is required to perform the routing and processing through the various hardware and software at the message layer is what is being verified by the mechanism of this invention, which is not possible using existing techniques such as IP ping or LSP ping, as is known in the art.

In order to detect faults in the Content Transformation Engine 47 of the Forwarding Plane 40 of FIG. 3 a variation on the mechanism above is possible. The publisher 94 of FIG. 6 may be configured with an ingress transformation which does not modify the key fields 121,122,123,124,125,126 of FIG. 7. For example, a transformation may add additional fields without modifying the existing fields; such additional fields will be ignored by Connectivity Verification Manager 103 and 104. This will cause the ping message to be sent through the Content Transformation Engine 47 of the Dataplane 96 of FIG. 6. The subscriber 101 of FIG. 6 may be configured with a similar egress transformation. This permits fault detection and latency measurement across the entire Forwarding Plane.

In practice, security measures should be taken with connectivity verification tests between message routers to ensure that they are not susceptible to denial of service attacks or other attacks known in the art. One method of doing so is to restrict access to the subscribers 95, 98 and 101 of FIG. 6 to be in the same closed user group (CUG) as is known in the art (refer to U.S. patent application Ser. No. 11/012,168, the contents which are herein incorporated by reference, for an example of a closed user group technique for content-routed networks known as entitlements).

As an addition to the ping mechanism described above, the path followed by messages through the message layer network from the ping source router to the ping destination router can be captured in order to determine the actual path taken by the ping-request message and to optionally compare the actual path followed by the ping-request message to the path computed by the routing protocols to determine whether they match.

Figure 9:
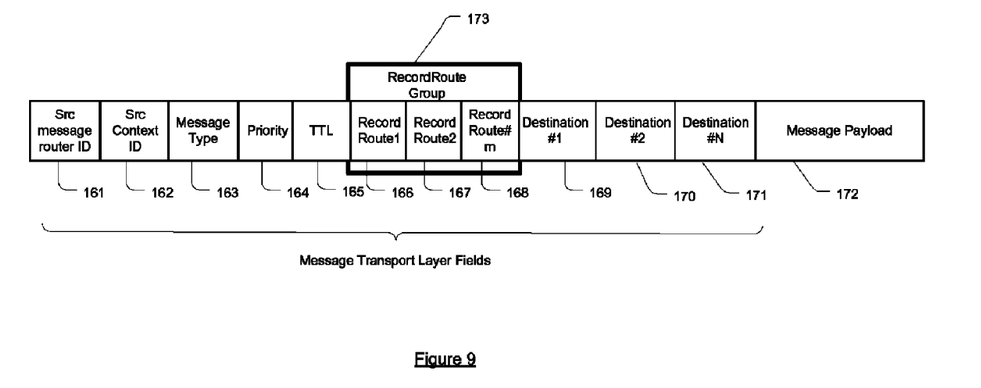
FIG. 9 shows the protocol fields at the Message Transport layer used to transport a request message between message routers.

FIG. 9 shows some example fields in the Message Transport layer 85 of FIG. 5 which comprise a source message routerID 161, source context ID 162, message type 163, message priority 164, Time To Live (TTL) 165, a plurality of RecordRoute blocks 166 through 168 which are sub-TLVs nested within a RecordRouteGroup TLV 173 and a plurality of Destination blocks 169 through 171. Each of these fields is preferentially encoded as "Type, Length, Value (TLV)" as is known in the art although other encodings are also possible.

Referring to FIG. 4, a ping source router 56 sending a ping-request to remote message router 58 preferentially includes a RecordRouteGroup TLV 173 in the Message Transport layer 85 of FIG. 5 to indicate to intermediate routers that they are to record their routerID in the message before forwarding. It also includes an initial RecordRoute sub-TLV 166 with its own routerID. In so doing, if the ping-request message 120 travels along the message router path 56, 55, 54, 58, then the routerIDs for these message routers is recorded in the RecordRoute sub-TLVs 167 through 168 of the ping-request message. These routerIDs are then returned to message router 56 by message router 58 in the ping-reply message 140. Message router 56 then compares the actual path taken by the request to the path generated by the routing protocols to ensure they are the same. The comparison could be performed the message router itself or offline by some diagnostic tool, but in any event, the captured path of the message is compared to the path generated by routing protocols from the topology information they have of the message layer overlay network. It should be noted that there is a race condition in which the control plane routing tables could be changing as the message is traversing the network and thus the recorded path would differ from the path computed by the control plane. Since this type of race condition can normally occur, the diagnostic tool performing the comparison would, upon detecting a mismatch between the paths, re-launch the ping-request message as above with the RecordRoute TLV to capture another path trace for comparison against the path generated from the control plane.

Fault Isolation

Fault isolation at the message layer is another aspect of this invention. The fault isolation mechanism is modeled after the traceroute capability of the Internet Protocol (IP) which is known in the art. The problem to solve is that when a message layer ping is used, such as described above, but the ping-reply is not received by the sender then there is a loss of communications along the path of either ping source to ping destination or from ping destination to ping sender and a mechanism is necessary to determine where along these paths the message loss or "black hole" is occurring. To do this, a message layer traceroute capability, as described below, is used.

At the Message Transport layer 85 of FIG. 5, protocol fields preferentially used are shown in FIG. 9. The relevant fields for this discussion are the Src message router ID 161 which is the identifier of the message router sending the message, the Src Context ID 162 which is set by the source message router when the message is sent, the Message Type 163 is usually set to "Data" for normal messages, TTL 165 which is a count of the number of message layer router hops remaining that the message is allowed to traverse, Destination #1 169 which is the router ID of the message router to which this message is targeted.

In reference to a source router 56 of FIG. 4 wishing to trace the path at the message layer to destination message router 58, the following is performed: the OAM publisher 94 of message router 56 preferentially creates a message with protocol layers 87, 85, 83, 81, 80 and with the contents of the XML payload 87 preferentially set to that of ping message 120. The fields dest-router 121 and dest-sub 122 of FIG. 7 are set to match the subscription entered by the OAM subscriber on the destination message router 58. The relevant Message Transport fields of FIG. 9 are set as follows: Src message routerID 161 is set to the router ID of message router 56, the Src ContextID 162 is set to identify the sending application or user on message router 56, the Message Type 163 is set to indicate a "Data" message, the TTL 165 of this first message is set to one. The message is routed based on the message content as described earlier preferentially using Content Matching and Forwarding Engine 46 of FIG. 3 and it is determined that the destination is message router 58, therefore Destination 169 is set to the routerID of message router 58. Message router 56 then determines that the next hop toward message router 58 is via message router 55, so the message is transmitted out a link with appropriate COS toward next hop message router 55. At message router 55, the Destination #1 field 169 is the only destination router in the list and its value is not the routerID for message router 55, it decrements the TTL field 165 of the message by one to zero. Since the TTL 165 is now at zero, the message is not allowed to be forwarded further, and so message router 55 constructs an OAM Unreachable message to be returned to the originating router.

Figure 10:
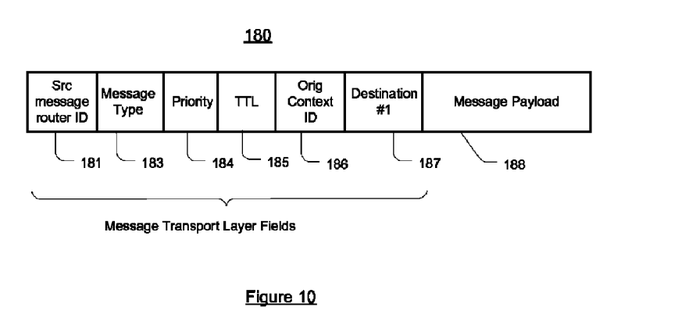
FIG. 10 shows the protocol fields at the Message Transport layer used to transport an OAM Unreachable message back to a message originator.

The OAM Unreachable message 180 is preferentially shown in FIG. 10. The fields are set as follows by message router 55: Src message router ID 181 is set to the routerID of message router 55, the Message Type 183 is set to "OAM Unreachable" to be distinguished from a data message, the priority 184 is set to the same priority as the received message, the TTL 185 is set to 255, Orig Context ID 186 is set to the Src Context ID 162 of the received message, Destination #1 187 is set to the Src message routerID 161 of the received message and the Message Payload 188 is set to the Message Payload 172 of the received message. Message router 55 then performs a routing lookup to determine the next hop to router 56, determines that it has a direct link to message router 56 and transmits the message on the connection with the appropriate COS. Note that no content routing on the message payload is performed by message router 55. Message router 56 receives the message and examines the Message Type 183 to determine that it is an "OAM Unreachable" message to then perform special processing. Using the Orig Context ID 186, message router 56 dispatches the message to the application or user associated with this ID. The application receives the "OAM Unreachable" message and then knows that message router 55, whose routerID is carried in field Src message routerID 181 is the first hop toward the final destination and that it is bidirectionally reachable. Message router 55 then creates another message as done previously, but this time sets the TTL field 165 to two, and launches the message along the connection with the appropriate COS to the next hop toward message router 58, which again is message router 55. Upon receiving the message, message router 55 determines that its routerID is not in the destination list and decrements the TTL field 165 from two to one. Message router 55 then performs a routing table lookup for Destination #1 169, which is message router 58, determines that the next hop is message router 54 and sends the message along a connection with the appropriate COS. Upon receiving the message, message router 54 looks for its router ID in the destination list 169, determines that it is not present and decrements the TTL 165 from one to zero. Since the TTL 165 is now at zero, the message is not allowed to be forwarded further, and so message router 54 constructs an OAM Unreachable message 180 to be returned to the originating router, as described earlier.

The OAM Unreachable message 180 is returned to message router 56 also as described earlier, only this message will have the routerID of message router 54 in the Src message routerID 181. In this manner, message router 56 now knows that the second hop toward message router 58 is message router 54 and that bidirectional connectivity exists between them. The above procedure is repeated one hop at a time until either the final destination, message router 58, is reached or until no response is received by message router 56 to a given message send for some configured amount of time. If no response is received with some TTL value, say t, the next message is sent with a TTL value 165 one higher than the last time (t+1). This is preferentially repeated two more times if no response is received, to allow diagnosis of the case where forwarding is working at hop t but OAM Unreachable response generation is not. If no response is received from these final attempts, then this would suggest that there is a forwarding problem around the message router t hops from the source toward the destination message router and that is where further diagnostic measures should be focused.

It should be noted that in the message used as the traceroute request, preferentially the message of FIG. 9, the Message Payload 172 could be constructed such that it matches subscriptions from several message routers and thus there would be several Destination blocks 169 through 171 in the message. This type of multicast traceroute would cause several OAM Unreachable messages to be returned to the originating message router for any request message that was branched to multiple other message routers. These multiple responses would need to be correlated by the source router using the information in the RecordRoute TLVs to deduce the multicast tree formed to each of the leaves 169 through 171 of the original message. Since the network 50 uses application-level multicast to efficiently deliver messages to multiple points in the network, the ability for the traceroute route request to also be able to operate in this application multicast routing mode is important to be able to properly diagnose network behavior.

In practice, security measures should be taken with traceroute tests between message routers to ensure they are not susceptible to denial of service attacks or others known in the art. One method of doing so is to restrict access to the subscribers 95, 98 and 101 of FIG. 6 to be in the same closed user group as is known in the art.

Non-Receipt of Messages

Yet another problem that can occur in a message network is that a subscriber may suspect that it is not receiving messages that it should be receiving. These messages could be published to a topic or queue, as with JMS, or to a Web Service Address, or preferentially, XML messages are published and the message network routes these messages to interested subscribers as a result of content routing: matching the content of the message to content-based subscriptions in the form of XPath expressions entered by the subscriber. There are several possible reasons that a subscriber is not receiving the messages it desires to receive and some of these reasons and the mechanisms to resolve them are described below.

By way of example, let us assume that subscriber 71 of FIG. 4 believes it is not receiving certain types of messages from publisher 64. What is desired is to perform special tracing of the message believed not to be reaching subscriber 71 from publisher 64 to determine the location of any fault in message delivery. The mechanisms to do so are now described. The ingress message router 56 is configured to detect the particular message from the particular publisher which is to be traced. Preferentially, message router 56 is configured with an XPath filter (the trace filter) that matches the message to be traced from publisher 64, along with the destination message router 58 and the destination subscriber 71 which claims to not be receiving the message. Note that a list of destination message routers and associated destination subscribers could also be provided to test connectivity to multiple destinations at once. This XPath filter is processed by the Content Matching and Forwarding Engine 46.

The message handling is first described in the context of tracing the message to egress message router 58 and subscriber 71. When the message is routed by the Content Matching and Forwarding Engine 46, the results returned are examined for the configured destination message routerID—namely that of message router 58. If this routerID is not returned by the Content Matching and Forwarding Engine 46, then the operator is alerted that a message that was being traced could not be routed from the ingress router toward the egress router due to lack of a subscription match. This allows further troubleshooting to determine whether either no subscription matching the message has been entered by subscriber 71, or whether the subscription from the egress message router 58 has not been properly received and processed by the ingress message router 56.

It should be noted that several other situations can occur that prevent the message from reaching the target subscriber or egress router and these would also be reported to the operator. Examples include: a subscription from the destination router matches the message, but there is no route to the destination router or the message matches a filter or firewall rule indicating that it is not to be admitted into the network. The message to be traced received from publisher 64 can also optionally be logged on message router 56 when the trace filter is matched in order have a copy of the message to perform further diagnostic tests without needing to involve the publisher to resend the message.

Figure 11:
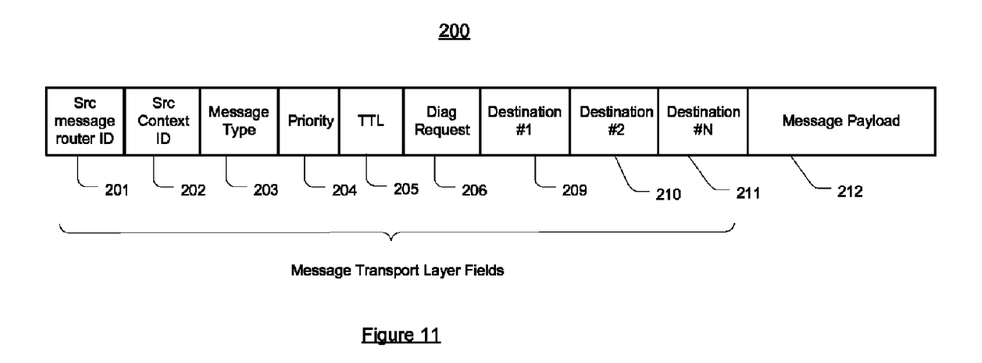
FIG. 11 shows the protocol fields at the Message Transport layer needed for a request message to perform diagnostic tracing of a message toward one or more subscribers.

Note that other triggers of tracing are also possible within the scope of this invention, such as a flag in the message from the publisher indicating that this message is to be traced. If the routerID for egress router 58 is returned by the Content Matching and Forwarding Engine 46, a new Message Transport layer field is preferentially added to the message 200 as shown in FIG. 11, namely the Diag Request field 206. All other fields of the message 200 of FIG. 11 are set as described previously. The Diag Request field 206 indicates that Diagnostics are to be performed on this message and that therefore special message handling procedures are to be applied for this message 200 in cases of error at transit routers and at the egress router or routers identified in the Destination list 209 through 211, specifically message router 58 in this case.

Figure 13:
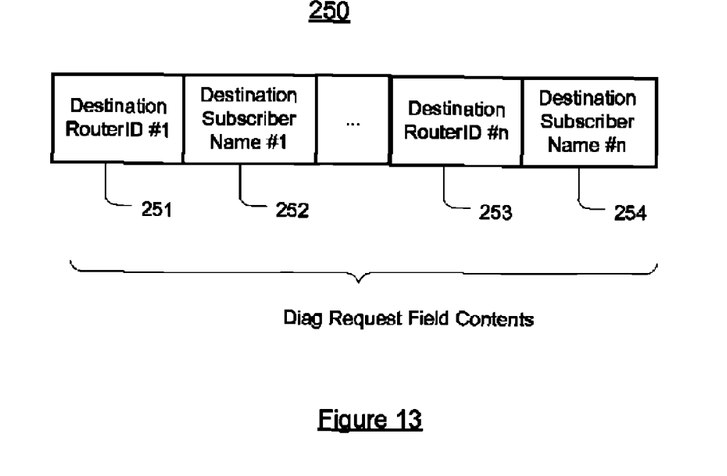
FIG. 13 shows the sub-TLVs of the Diag Request TLV, used to gather diagnostics information

The tuple (destination routerID, destination subscriber name) is encoded into the Diag Request field 206 for use by the egress router. The structure of the Diag Request field 206 is shown as 250 in FIG. 13. The contents of the Diag Request field are one or a plurality of tuples of destination routerID 251 and destination subscriber name 252. The destination routerID is preferentially an IP address and the destination subscriber name is preferentially a null-terminated ASCII string uniquely identifying the subscriber within the context of the destination routerID. The Src Context ID 202 is set by the source router 56 to identify the particular message trace being performed and is to be returned in the reply message. The message 200 is then forwarded by message router 56 toward the egress message router 58 via the next hop message router which is determined to be message router 55. Message router 55 forwards the message to its next hop, message router 54 which forwards the message 200 to message router 58 as described previously.

Figure 12:
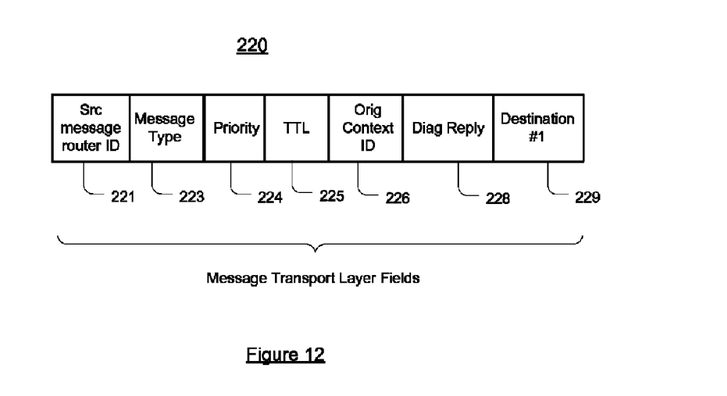
FIG. 12 shows the protocol fields at the Message Transport layer needed for a reply message to perform diagnostic tracing of a message back toward the publisher.
Figure 14:
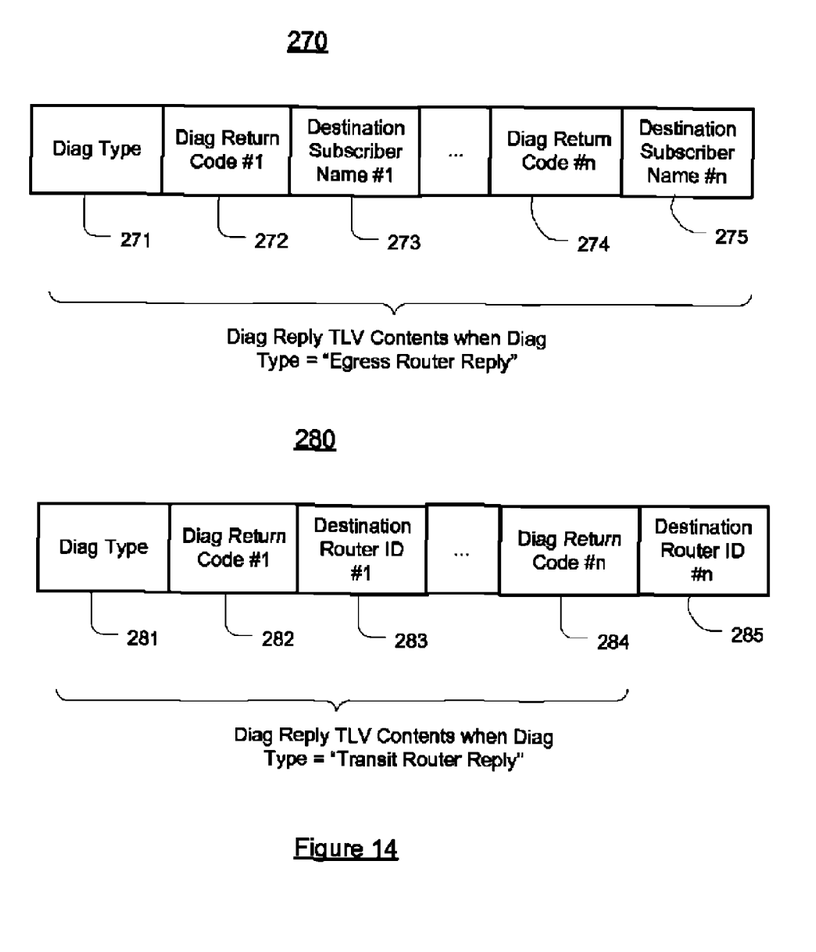
FIG. 14 shows the multiple sub-TLV structures of the Diag Reply TLV.

Message router 58 determines that the message 200 is to be routed to one or more directly-attached subscribers since its routerID is in the field Destination #1 209 of FIG. 11. Message router 58 preferentially performs content routing on the message using the Content Matching and Forwarding Engine 46 to determine which local subscribers are to receive the message. The results of the content routing lookup are compared against the list of subscribers in the Diag Request field 206 since only the subscribers listed are to be processed for this message. In this case, subscriber 71 is listed in the Diag Request field 206. If subscriber 71 was also returned from the Content Matching and Forwarding Engine 46, then the reply message 220 of FIG. 12 is created by message router 58. The Src message routerID 221 is set to the routerID of message router 58, Message Type 223 is set to "OAM Diag Reply" to distinguish it from regular message data, Priority 224 is set to the priority 204 of the original message 200, TTL 225 is set to 256, Orig Content ID 226 is set to Src Context ID 202 from the original message 200, Diag Reply 228 is set to contain the tuple (subscriber name, "Successful Match") for subscriber 71 to indicate that the message matched a subscription from the desired subscriber and Destination #1 229 is set to the routerID of message router 56 from the Src message routerID 221 of FIG. 11. The structure of this instance of the Diag Reply 228 is shown as 270 in FIG. 14. The Diag Reply TLV 228 contains a Diag Type 271 which in this case is set to a value of "Egress Router Reply" to indicate that this message is from an egress router rather than a transit router, and it then also defines the remainder of the Diag Reply TLV 228 as containing a list of one or a plurality of Diag Return Code 272 and Destination Subscriber Name 273. In this example, the subscriber name for subscriber 71 is placed in Destination Subscriber #1 field 273 and the "Successful Match" value is placed in Diag Return Code #1 272. The message 220 is then sent by message router 58 to message router 56. If at message router 58, subscriber 71 is not returned from the Content Matching and Forwarding Engine 46, then the contents of Diag Reply field 228 is set to with a Diag Type 271 of "Egress Router Reply", Diag Return Code #1 272 is set to "No Match" and the Destination Subscriber Name #1 273 is set to the subscriber name for subscriber 71 in the message 220 and the reply message 220 is sent to message router 56.

Note that there could be several other reasons why the message would not be allowed to reach the subscriber which include the subscriber being offline, or the subscriber having entered a filter to not receive this information. Each of these non-delivery reasons would have a unique non-delivery reason placed into the Diag Return Code #1 272 field. The original message 200 is discarded by message router 58 and is not delivered to subscriber 71 since it is a probe message. Note that in other embodiments of this invention, the actual message could, based on configuration or a flag in the message or by other means, be delivered to the subscriber instead of being discarded at the egress router.

Upon receiving the reply 220, message router 56 correlates this reply 220 with the original trace request 200 based on the value of the Orig Context ID 226 and informs the operator of the success or failure of the trace operation for the subscriber listed in the Destination Subscriber Name #1 273 field of the Diag Reply TLV 228. Note that as an option of this invention, message router 58 does not return the reply message 220, but rather forwards the message 200 to the named subscriber 71 and the subscriber then creates and returns the reply message 220. This modification has the additional benefit of allowing the source router 56 to know that the message 200 reached all the way to the end subscriber, rather than simply to the egress message router and thus provides a more complete connectivity verification.

Should an error occur in the processing of the original message 200 at a transit message router, such as message router 54, where it cannot forward the message 200 to destination router 58, then the presence of the Diag Request field 206 in message 200 causes the transit router 54 to return an error message 220 to the source router 56. The message 220 is created by message router 54 as described previously for message router 58, only the Diag Reply field 228 is preferentially set with the structure shown in 280 of FIG. 14. In this case, the Diag Type field 281 is set to "Transit Router Reply", the Diag Return Code #1 282 is set to "Router Unreachable" and the destination routerID that is not reachable is placed into the Destination RouterID #1 field 283. In this case, the routerID of message router 58 is placed into the Destination RouterID #1 field 283 within the Diag Reply TLV 228. This message is then sent to message router 56 for processing. As such, forwarding problems at intermediate message routers are reported back to the source message router which then notifies the network operator of the fault and location of the fault. Note that several other reasons can also prevent forwarding of the original message 200 to some destination routers and they would receive their own Diag Return Code #1 282 value.

It should be noted that message tracing to multiple destinations for a single message can be performed using the procedures above by providing a list of (destination routerID, destination subscriber name) tuples in the Diag Request field 206 as shown by 253 and 254 respectively and in the Diag Reply field 228 as shown by 274 and 275 respectively.

As a further extension to the above, the reply message 220 could also be returned to the originating publisher to allow user self-test of message delivery—similar to the use of ping in IP networks. In practice, security measures should be taken such that publishers can be prevented from launching denial of service attacks or others known in the art. One method of doing so is to rate limit the number of Diag Requests 200 a publisher can initiate and limit the number of separate Diag Request tuples 206 in a single message header. In addition, it may not be desirable for publishers to be able to discover what subscribers receive their messages. One method of doing so is to restrict publishers from initiating a Diag Request 200 without intervention from the network operator.

Subscription Connectivity Verification

Yet another aspect of this invention is the ability to verify that the subscriptions issued by a particular subscriber to its message router are reachable from other message routers in the network. The method to do so involves using the trace message 200 and trace reply message 220 described previously. By way of example, we explain how the content-based subscriptions entered by subscriber 71 of FIG. 4 can be validated as being reachable from another message router 52 in network 50. Note that the same mechanisms can be applied when the subscriptions are topic, subject or queue based, as are used in other message systems or based on a Web Service Address.

The subscriptions from subscriber 71 are collected either directly from subscriber 71 or from its attached message router 58. For each subscription, a message is created that matches exactly that particular subscription and this message is used as the "trace message" 200 described earlier. Each such message 200 is sent from message router 52 as a "trace message", and where the (routerID, subscriber name) tuple used in the Diag Request field 206 are the routerID for message router 58 and the subscriber name for subscriber 71 respectively. The procedures described above are then performed on this trace message 200 and allow the operator to determine whether this particular subscription from subscriber 71 is reachable from message router 52 and if not aid in localizing the source of the error. As described earlier, the trace message reply 220 could be returned by the egress message router 58 or by the subscriber 71 itself. This procedure is repeated for each subscription of that subscriber.

It will be appreciated that an exemplary embodiment of the invention has been described, and persons skilled in the art will appreciate that many variants are possible within the scope of the invention.

All references mentioned above are herein incorporated by reference.

We claim:

1. A method of performing connectivity verification in an application layer content-routed overlay network including a plurality of routers and wherein messages are transported through the network over a message transport layer between publishers and subscribers by matching content of the messages with prior subscriptions associated with said subscribers, comprising:

constructing a ping request message at a connectivity manager in an originating router, wherein said ping request message contains content matching a subscription associated with a target subscriber attached to a terminating router;

said connectivity manager sending said ping request message to a publisher attached to the originating router for injection into a forwarding plane at the originating router whereby said ping-request message is forwarded through the content-routed network over said message transport layer along a user data path to the target subscriber by content matching with the subscription associated with said target subscriber in accordance with a content-routing protocol;

in response to the target subscriber receiving said ping request message, a connectivity manager at the terminating router constructing a ping-reply message and sending it to a publisher at the terminating router for injection into a forwarding plane at the terminating router whereby the ping-reply message is returned through the content-routed network over said message transport layer along a user data path to a receiving subscriber attached to the originating router by content matching with the subscription associated with the receiving subscriber in accordance with a content-routing protocol;

said receiving subscriber at the originating router forwarding the received ping-reply message to the connectivity manager at the originating router; and said connectivity manager at the originating router determining connectivity to said target subscriber based on the receipt of said ping-reply message at the receiving subscriber.

2. The method of claim 1, wherein the subscription information for the receiving subscriber in the ping reply message is obtained from data fields in the ping request message.

3. The method of claim 2, wherein the ping request message contains specific fields containing information about matching subscriptions, and fields containing a source timestamp and a source sequence number.

4. The method of claim 3, wherein the terminating router is configured to compare a current local timestamp against the timestamp in the ping request to calculate the time taken for the ping request to travel from the originating router to the terminating router.

5. The method of claim 3, wherein the ping request message is also assigned a particular class of service, wherein the ping request message is treated by the network at the priority level associated with the assigned class of service.

6. The method of claim 1, wherein the connectivity verification manager at the originating router also injects a subscription associated with a subscriber in the originating router, and a connectivity verification manager at the terminating router adds the information matching the subscription of the subscriber at the originating router and a local timestamp into the ping reply message so that the ping reply message is properly routed to the originating router using the content routing protocol.

7. The method of claim 1, wherein the verification connectivity manager at the originating router validates a ping reply message against information contained in the corresponding ping request message, and upon determination of a valid ping reply message reports the existence of connectivity to the terminating router.

8. The method of claim 7, wherein upon receipt of the ping reply message the connectivity verification manager at the originating router records a timestamp to perform message latency calculations based on the timestamp of when the original ping request was sent, the timestamp recorded in the ping reply message, and the timestamp upon receipt of the ping reply message.

9. The method of claim 1, wherein the ping request messages is sent as a multicast message, and the multicast ping request message is directed to routers attached to a set of designated subscribers, and the ping request message is forwarded by subscription matching for the designated subscribers.

10. The method of claim 1, wherein the ping request message is a transformed version of a message originating from the publisher attached the originating router.

11. The method of claim 10, wherein the transformed version comprises the original message with at least one additional field, whereby the message is passed through a content transformation engine in the originating router to permit fault detection and latency measurement across an entire forwarding plane of the network.

12. The method of claim 1, wherein said ping messages comprise fields that are modified as the ping messages pass through the network to record the path traversed by the message and thereby provide a record route capability.

13. The method of claim 1, wherein in the event that a forwarding router is unable to forward the message on its next hop toward a destination router, the forwarding router returns an unreachable message to the originating router indicating that the message can go no further than the forwarding router, thereby creating a trace route capability.

14. A method of checking, in a content routed network including a plurality of routers wherein messages are transported through the network over a message transport layer between publishers and subscribers by matching content of the messages with prior subscriptions associated with said subscribers, that subscriptions issued by a particular subscriber are reachable from other message routers in the network, comprising:

collecting subscriptions from the particular subscriber;

creating a message containing content that matches each subscription; and forwarding said messages from an originating router as trace messages through the content-routed network over said message transport layer along a user data path to target subscribers by content matching with the subscription associated with said target subscribers in accordance with a content-routing protocol to determine whether each subscription of said particular subscriber is reachable from said originating router.

15. The method of claim 14, wherein downstream routers receiving said trace message and unable to forward said trace message to an egress router associated with a particular subscriber return an advisory message to the originating router.

16. A content router capable of performing connectivity verification in a content routed network wherein messages are transported through the network over a message transport layer between publishers and subscribers by matching content of the messages with prior subscriptions associated with said subscribers, comprising:

a connectivity and verification manager configured to construct a ping request message containing content matching a subscription associated with a target subscriber attached to a terminating router;

wherein said connectivity and verification manager is configured to send said ping request message to a publisher attached to the router for injection into a forwarding plane whereby said ping-request message is forwarded through the content-routed network over said message transport layer along a user data path to the target subscriber by content matching with the subscription associated with said target subscriber in accordance with a content-routing protocol; and wherein said connectivity and verification manager is configure to monitor said message transport layer for a ping reply message returned by the target subscriber attached to the terminating router in order to determine connectivity to the target subscriber based on the receipt of the ping-reply message by a receiving subscriber attached to the router.

* * * * *